No. 751,950. PATENTED FEB. 9, 1904.
W. M. SHARP.
DENTAL MOUTH MIRROR.
APPLICATION FILED MAY 2, 1902. RENEWED JULY 17, 1903.
NO MODEL.

Witnesses:
Franck L. Ourand
Frank G. Radelfinger

Inventor:
Warren M. Sharp,
by Louis Bagger & Co.,
Attorneys.

No. 751,950. Patented February 9, 1904.

UNITED STATES PATENT OFFICE.

WARREN M. SHARP, OF BINGHAMTON, NEW YORK.

DENTAL MOUTH-MIRROR.

SPECIFICATION forming part of Letters Patent No. 751,950, dated February 9, 1904.

Application filed May 2, 1902. Renewed July 17, 1903. Serial No. 166,043. (No model.)

*To all whom it may concern:*

Be it known that I, WARREN M. SHARP, a subject of the King of Great Britain, residing at Binghamton, in the county of Broome and State of New York, have invented new and useful Improvements in Dental Mouth-Mirrors, of which the following is a specification.

My invention relates to dental mouth-mirrors; and the object of the same is to provide simple and efficient means for preventing the saliva from gaining access to the back of the mirror and clouding the silvering.

The novel construction devised by me for carrying out my invention is fully described in this specification and claimed, and illustrated in the accompanying drawings, forming a part thereof, in which—

Figure 1:
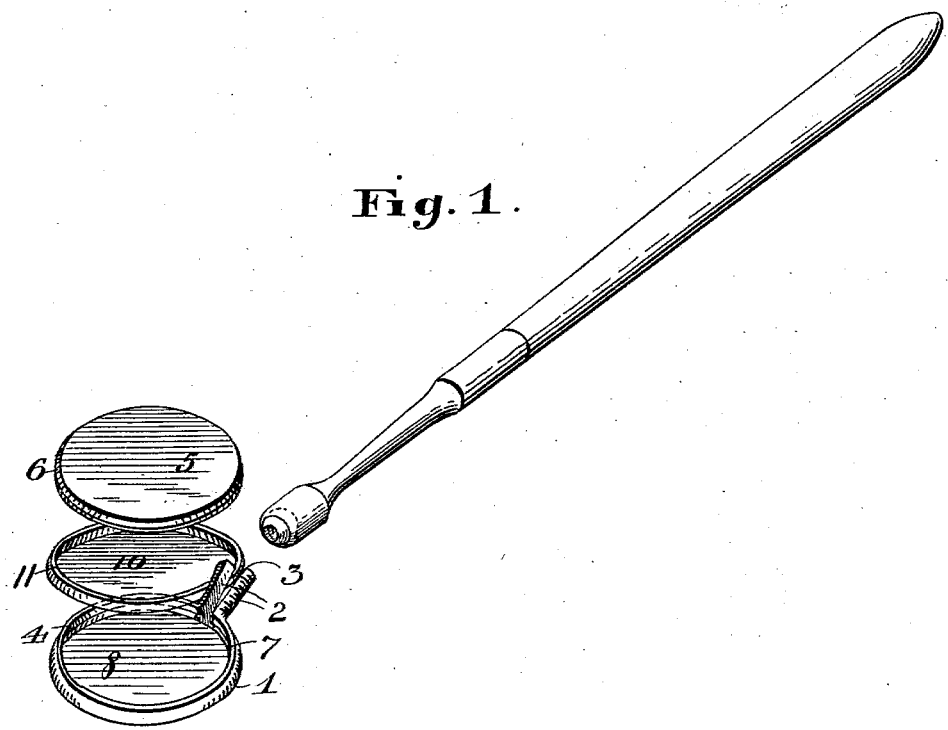
Figure 2:
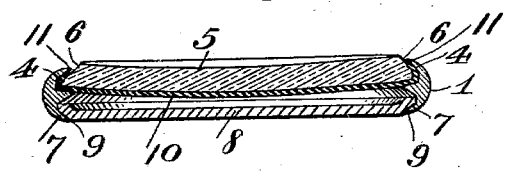
Figure 3:
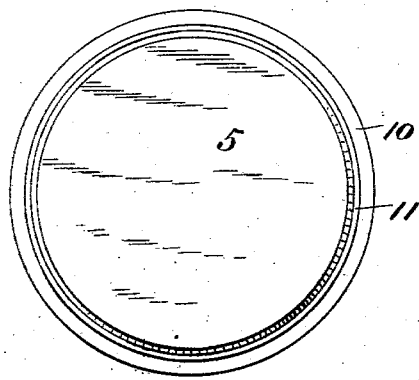

Figure 1 is a perspective of my mirror, the frame for holding the same, and the backing-plate, the parts being separated. Fig. 2 is a transverse section of the same with the parts together. Fig. 3 is a plan view of the mirror with a gutta-percha disk attached thereto.

Like numerals of reference designate like parts in the different views of the drawings.

The numeral 1 designates a circular expansible frame having a threaded stem 2 thereon, which is split throughout its length at 3 to enable the frame 1 to be expanded. The frame 1 has an undercut uniformly-beveled rim 4, designed to accommodate a concave mirror 5, having a sloping uniformly-beveled edge 6. A rim 7 is also formed on the opposite side of the frame 1, is identical in construction to the rim 4, and is designed to accommodate and retain a backing-plate 8, having a beveled edge 9.

The construction described above forms no part of my present invention, but is the form to which my improvements are applied.

In using the device constructed as above described the portion of the rim 4 projecting above the surface of the mirror 5 forms a ledge which serves to catch the saliva, and this saliva soon finds its way around to the back of the mirror and clouds the silvering. To prevent this entrance of moisture, I employ a circular disk 10, a little larger than the mirror 5, of some adhesive substance which is impervious to moisture—such as rubber, sealing-wax, or gutta-percha. When the disk is made of gutta-percha, volatile solvent, such as chloroform or the like, is applied to one side of the disk. This application renders this side of the disk very adhesive, and it is applied to the silvered side of the mirror. Care is taken to properly center the edge 11 of the disk 10 so it will project beyond the edge of the mirror 5 a distance of about one-half the thickness of said mirror. The frame 1 is then warmed until hot enough to render the disk 10 soft on coming in contact therewith. The frame 1 is then expanded slightly— that is, enough to permit the mirror to enter—and the mirror forced in. This action will crimp the projecting edge 11 around the edge 6, so that it will intervene between the edge 6 and the rim 4 to form a packing. The gutta-percha being plastic will adhere to both the edge of the mirror 5 and the rim 4 and since it is impervious to water will prevent the entrance of all moisture. In removing the mirror to replace it by another the frame 1 is first heated slightly, after which the mirror is easily removed. When sealing-wax is used, no solvent need be applied, but the wax is heated slightly.

I do not wish to be limited as to details of construction, as these may be modified in many particulars without departing from the spirit of my invention.

Having described my invention, what I claim as new, and desire to secure by Letters Patent, is—

1. The combination with a silvered mirror of a thin sheet of gutta-percha adhering positively to the silvered surface, substantially as described.

2. The combination with a silvered mirror, of a thin sheet of gutta-percha adhering positively to the edges and silvered surface of said mirror to keep moisture from gaining access to said silvered surface, substantially as described.

3. In a dental mirror, the combination with a frame, of a mirror, a covering for the silvered back and sides of said mirror which cover is impervious to moisture and positively adheres to the said silvered back and sides of said mirror, substantially as described.

4. In a dental mirror, the combination with a frame, of an elastic disk impervious to moisture mounted in said frame, a silvered mirror mounted in said frame with the edges of said elastic disk intervening between the edges of the disk and the frame to prevent the access of moisture to the silvered surface of said mirror, substantially as described.

In testimony whereof I have hereunto set my hand in presence of two subscribing witnesses.

WARREN M. SHARP.

Witnesses:
ROBT. G. CURRAN,
MAY E. LYNCH.